Aug. 5, 1969  D. W. MOLINS ETAL  3,459,456
ARTICLE FEEDING APPARATUS
Filed Dec. 20, 1967  5 Sheets-Sheet 3
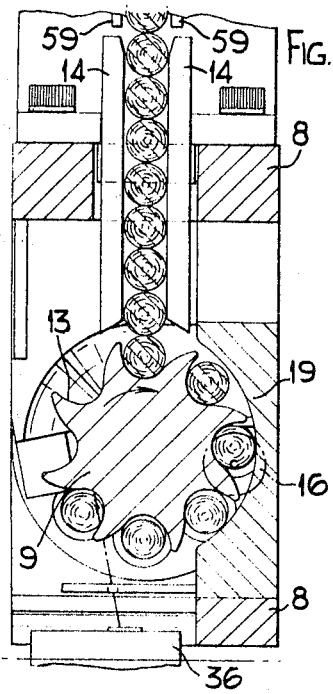
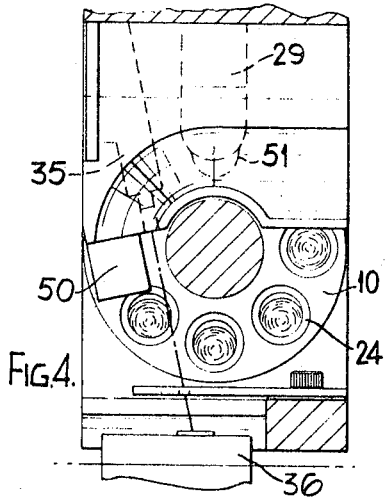
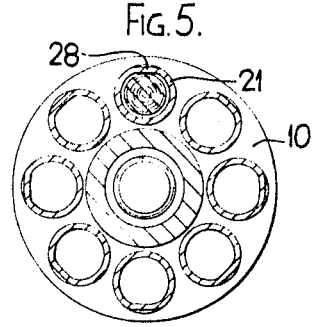
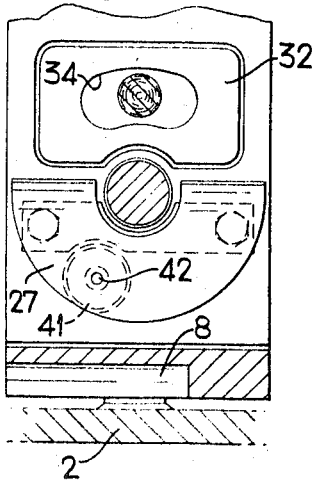
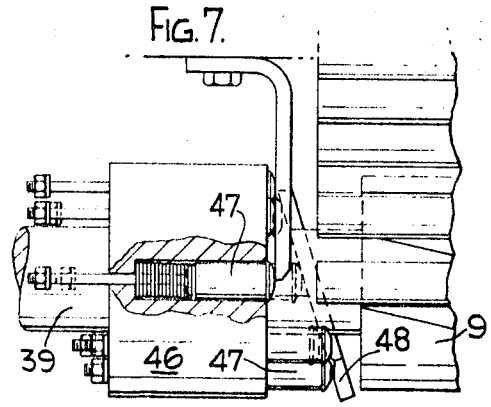
INVENTORS
Desmond Walter Molins
George Robert Bennett
BY
Watson, Cole, Grindle + Watson
ATTORNEY

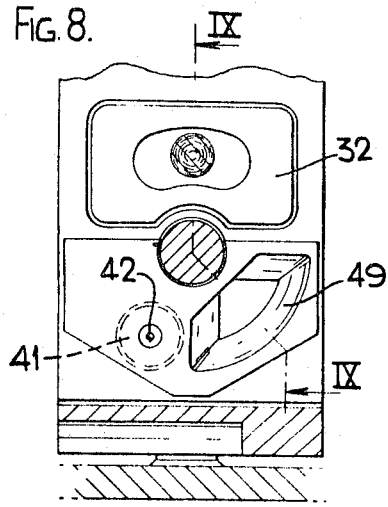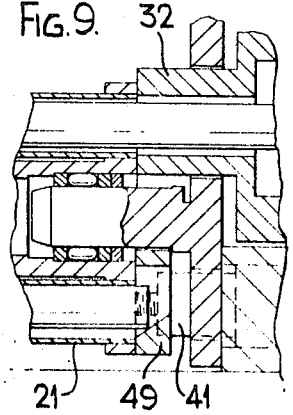

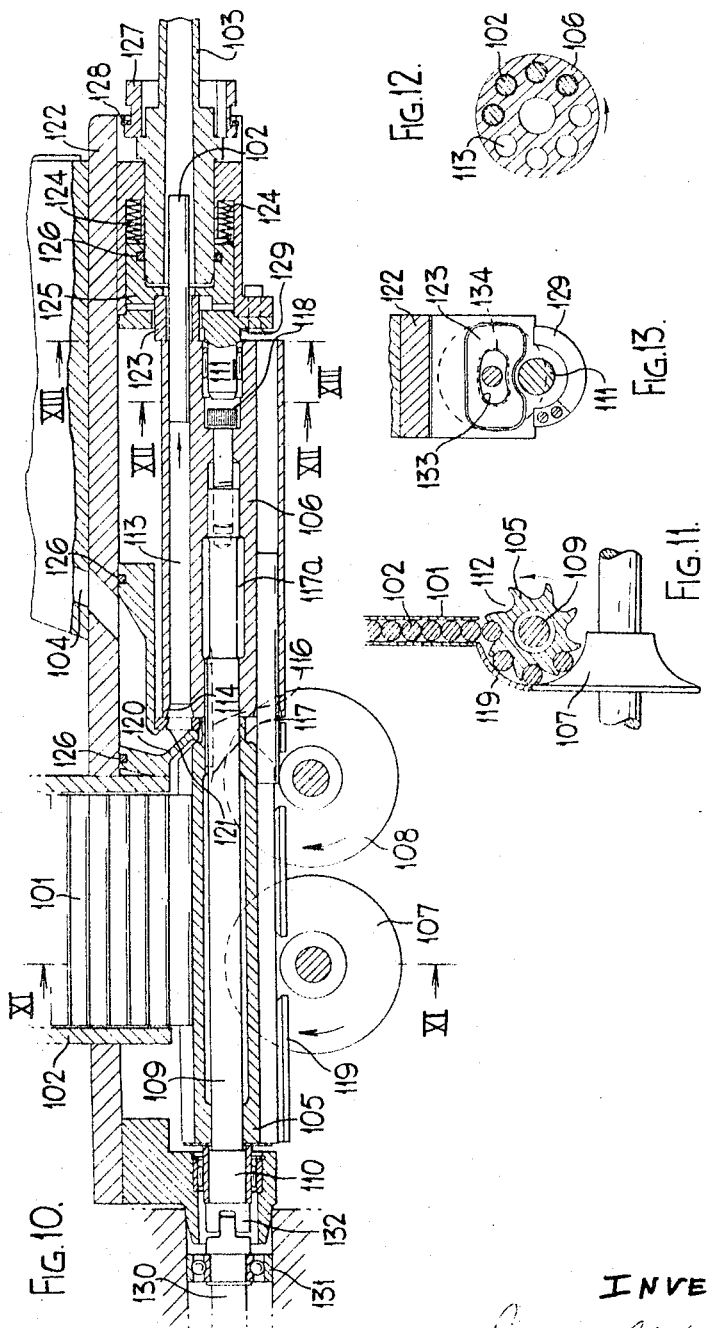

United States Patent Office 3,459,456
Patented Aug. 5, 1969

3,459,456
ARTICLE FEEDING APPARATUS
Desmond Walter Molins and George Robert Bennett, London, England, assignors to Molins Machine Company Limited, London, England, a corporation of Great Britain
Filed Dec. 20, 1967, Ser. No. 692,015
Claims priority, application Great Britain, Dec. 23, 1966, 57,611/66
Int. Cl. B65g 53/04, 53/40
U.S. Cl. 302—2    27 Claims

ABSTRACT OF THE DISCLOSURE

Apparatus for feeding plugs of cigarette filter material in a continuous stream from a magazine to a pneumatic feed pipe, having a continuously rotating fluted delivery rotor to scoop plugs out of the magazine and a discharge rotor rotating on the same shaft as the delivery rotor and having a number of tubular bores wherein the plugs are pushed by an air jet from the delivery rotor flutes to the discharge rotor tubes and then carried to a position where a further air jet blows them out of the tubes into the feed pipe.

---

This invention relates to apparatus for feeding rod like articles from a magazine into a pneumatic feed line. The invention is particularly, although not exclusively, concerned with feeding plugs of filter material which are subsequently to be cut up to provide the filters for filter tip cigarettes.

One way of feeding these plugs is from a magazine into a pneumatic line down which they are moved by means of compressed air. Apparatus has been proposed for doing this which involves the use of a fluted rotor to meter the plugs from the magazine, the air pressure being applied to the plugs in the flutes of the rotor or, alternatively, it has involved reciprocatory apparatus. The use of parts which reciprocate is not satisfactory since these cannot be operated at high enough speeds. This invention is particularly concerned with providing an improvement which is applicable to apparatus of the fluted rotor type. One of the main disadvantages of this sort of apparatus is that the rotor has to act as a pressure seal between the supply of compressed air and the magazine. This means that the vanes of the rotor have to be sealed against the rotor casting and this is difficult to achieve satisfactorily.

It is an object of this invention to provide an improved article feed apparatus which is of advantage in injecting articles into a pneumatic distribution system.

Accordingly, the present invention provides apparatus for feeding rod-like articles comprising a magazine in which they are stacked to extend horizontally and lie parallel with one another and which has an outlet through which they can be discharged downwardly by gravity, a pneumatic feed pipe into which they are fed with a horizontal movement, an extended discharge chamber to contain an article and to communicate in a first position through one end with a compressed air supply and through the other end with the feed pipe, which chamber is repeatedly movable between the first position and a second position in which an article from the magazine can be received endwise in the chamber, means to move an article endwise into the chamber at the second position, and guide means movable in synchronism with the discharge chamber to receive articles selectively from the magazine and convey them to the second position.

Preferably the apparatus comprises a plurality of discharge chambers and of guide means movable in continuous cyclical sequence. It can also comprise a delivery rotor and a discharge rotor, the discharge rotor having a plurality of open-ended tubes which constitute the discharge chambers and the delivery rotor being a fluted drum the flutes of which constitute said guide means.

The rotors can be mounted for rotation about a common axis and are spaced apart along the axis to accommodate a compressed air supply nozzle which is positioned so that the tubes in the discharge rotor register with it in succession as the rotor rotates.

Preferably the apparatus also comprises means to assist in bringing articles to rest in said chamber. This means can comprise a one-way valve which allows articles to pass in a direction to enter the chamber and obstructs them in the opposite direction and to which there is a smooth lead-in on the one side and the surface of which is discontinuous on the other side.

With advantage the apparatus further comprises a detector to detect an article projecting through the end of the discharge chamber through which articles enter the chamber and positioned at a point situated after the chamber moves through the second position and before it moves into said first position.

The means to move the articles endwise into the chamber can comprise a spring-loaded striker arranged to be released against the end of an article to push the article under the action of its spring loading.

Some embodiments of the invention will now be described, by way of example with reference to the accompanying drawings in which.

Figure 2:
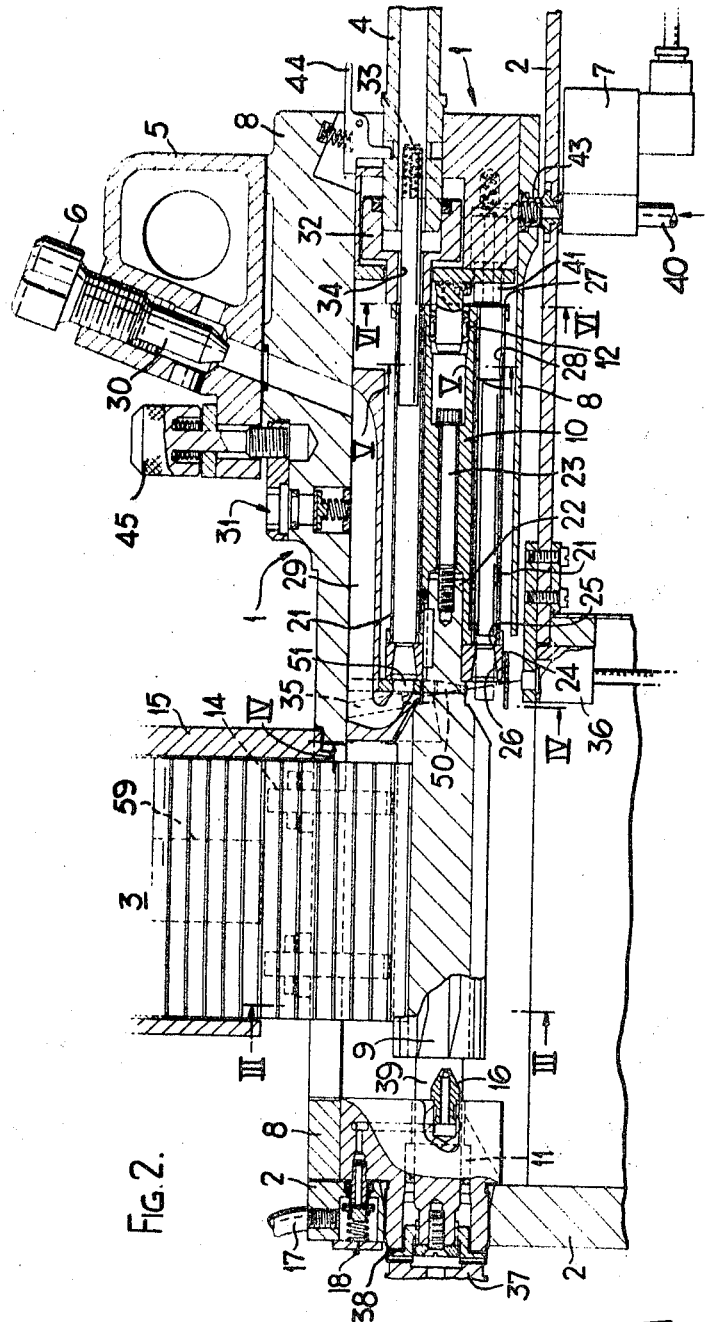
FIGURE 2 is a longitudinal section through one of the guns of FIGURE 1.

FIGURES 3 to 6 are enlarged sections on the lines III—III to VI—VI respectively of FIGURE 2, FIGURE 7 is an enlarged view similar to FIGURE 2 of a part of a modified plug gun, FIGURE 8 is a view similar to FIGURE 6 of a further modification, FIGURE 9 is a section on the line IX—IX of FIGURE 8, FIGURE 10 is a sectional view, similar to FIGURE 2, of another plug-feeding gun, and FIGURES 11 to 13 are sections of FIGURE 10 on the lines XI—XI, XII—XII and XIII—XIII respectively.

Figure 1:
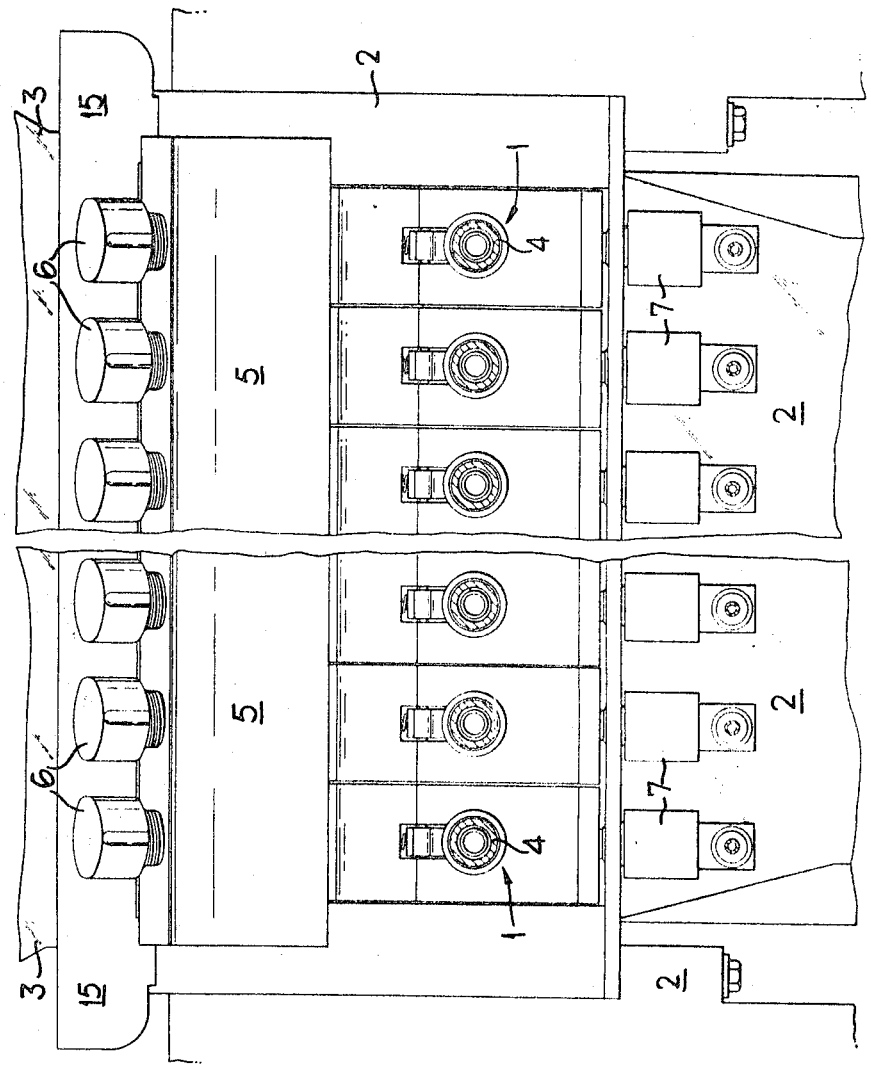
FIGURE 1 is a front elevation of a bank plug-feeding guns.

Referring to the drawings, and firstly to FIGURE 1 a number of plug guns 1 are arranged in side-by-side relationship in a gun block 2 to discharge plugs of cigarette filter material from a hopper 3 along feed pipes 4. The plug guns 1 are actuated by compressed air which is supplied through a manifold 5 from which individual supplies are tapped off to each gun 1 through valves controlled by manually operable knobs 6. Each plug gun 1 is connectible with a further compressed air supply for removing jammed plugs, through a reject controller 7 mounted on the gun block 2. The plug guns 1 each contain rotary members which are driven continuously from shafts connected one to each gun at the back of the gun block 2. Each gun 1 is separately removable from the gun block 2 whilst some or all of the other guns 1 are present. When a gun 1 is removed from the block 2 its associated compressed air valve is closed by operation of the knob 6 to avoid loss of air from the compressed air system.

Referring now more specifically to FIGURES 2 to 6, each plug gun 1 has a housing 8 which is a close sliding fit within the gun block 2 (the boundary between the two has been shown by a heavy line) and which supports a delivery rotor 9 and a discharge rotor 10 for continuous rotation together about a common axis in bearings 11 and 12. The delivery rotor is formed with eight flutes 13 which extend parallel with its axis of rotation and are shaped to assist in receiving plugs, and is positioned directly beneath the hopper 3 to receive plugs therefrom into its flutes 13 as it rotates. Plugs from the hopper 3 are separated into single stacks, one for each plug gun, by vertical extension 59 of guides 14. The front of the hopper 3 is closed by a plate 15 which interlocks with the housing 8 of each plug gun 1 and is raised prior to removal of any of the guns.

A compressed air jet 16 is positioned just in front (as viewed in FIGURE 2) of a shaft 39, carrying the delivery rotor 9 adjacent the end thereof remote from the discharge rotor 10. As the rotor 9 rotates each of its flutes 13 is successively moved past the air jet 16 whereupon a plug in the flute is blown along the flute to the discharge rotor 10. Air is supplied to the jet 16 from a pipe 17 through a valve 18 which shuts off when the plug gun 1 is removed from the block 2. A side wall 19 of the housing 8 holds plugs in the flutes 13 for part of the travel of the delivery rotor 9 but below the rotor 9 the housing 8 and the gun block are open so that rejected plugs can drop away.

The discharge rotor 10 acts to convey plugs from a lower position where they are received from the delivery rotor 9 to an upper position where they are blasted along the pipe 4 by compressed air. The rotor comprises eight tubes 21 disposed around the axis of rotation of the discharge rotor 10 and extending parallel therewith so as to be aligned one tube with each flute of the delivery rotor 9. The discharge rotor 10 is secured to an extension 22 of the delivery rotor 9 to rotate therewith, by means of an axial bolt 23. At the entrance to each tube 21 there is a one-way valve 24 having a flow passage for plugs travelling into the discharge rotor 10 from the delivery rotor 9, which flow passage consists of two parts: a first part in the form of a throat 25 which is only just large enough to allow plugs to pass freely, and a second, lead-in part comprising a funnel 26 to guide plugs from the delivery rotor 9 into the throat 25. The diameter of a tube 21 is somewhat larger than that of the throat 25; thus, as they are coaxial, there is a step between the two which generally prevents plugs travelling backwards out of the tubes 21 through the valves 24 towards the delivery rotor 9.

A buffer spring 27 is secured to a part of the housing 8 and lies across the end of the lower part of the discharge rotor 10 to contain plugs in the tubes 21 and each tube is formed with a bump 28 to slow the plugs down.

Between the adjacent ends of the two rotors 9 and 10 there is a gap to accommodate an inlet 51 for a compressed air supply in a position in line with the tubes 21 during the upper part of their travel. The mouth of the air inlet 51 is constituted by an orifice in a carbon block which forms a sliding seal with the end face of the rotor 10. The size and shape of the orifice are similar to the cross-section of the tubes 21. Thus as the rotor 10 rotates the tubes 21 are successively brought into communication with the compressed air supply for a short time so that a blast of air is administered to each tube in turn to propel a plug in the tube rapidly therealong. Air is supplied to the inlet 51 through a passage 29 in the plug gun housing 8, from the manifold 5 in the gun block 2, by way of a valve 30 controlled by the knob 6. A pressure connector device 31 is provided for coupling the passage 29 to a manometer to determine the operating pressure of the compressed air in the gun.

The pipe 4 and the air inlet 51 are arranged in line with one another and a coupling member 32 accommodates the end of the feed pipe 4 and guides plugs so that they are blown by air from the inlet 27 out of the tubes 21 into the pipe 4. The coupling member 32 is resiliently urged to seal against the end face of the rotor 10 by two springs, contained in blind bores in the housing 8, one 33 being positioned behind and the other in front of the pipe 4 as viewed in FIGURE 2. As is shown in FIGURE 6, the aperture 34 in the coupling member 32 is enlarged laterally to accommodate the relative sideways movement of plugs as they travel from the rotating tubes 21 into the stationary feed pipe 4.

A detector device consisting of a lamp 35 and a photoelectric detector 36 (see FIGURE 4) connected to actuate the reject controller 7, is positioned across the rearward end of the rotor 10 and between the rotors so that its beam lies across the ends of the tubes 21 just after plugs from the delivery rotor 9 have entered them. The beam is so positioned that if any plug is projecting from a tube after it should have entered the tube completely, the light beam is broken and the detector 36 is actuated. Plugs that do not project far enough to break the light beam are pushed back into their tubes by a ramp 50.

The rotors 9 and 10 are driven through an electromagnetic clutch comprising an electromagnet 37 mounted on a driving shaft supported in the gun block 2 and a magnetised keeper plate 38 carried on the shaft 39 for the rotors 9 and 10, which is supported in the bearing 11.

Jammed plugs which project out of the tubes 21 at their rearward end are rejected in response to a signal from the detector 36 by a blast of compressed air introduced by way of a feed pipe 40 passing through the reject controller 7, which controls the flow of air therethrough, and a spring-loaded tubular plunger 41 which bears against the buffer spring 27 in the position shown in FIGURE 6. The spring 27 is formed with an aperture 42 to admit compressed air to the tubes 21. A further spring-loaded plunger 43 is used to provide a releasable air connection for the rejection air between the plug gun 1 and the gun block 2.

The plug feed pipe 4 is secured to the plug gun by means of a spring-loaded catch 44 and is released by pushing the pipe 4 into the plug gun 1 and depressing the catch 44 and then withdrawing the pipe 4 whilst holding the catch 44 depressed.

The plug gun 1 is locked in the gun block 2 by a manually operated bolt 45 which is spring retracted clear of the plug gun when it is unscrewed.

The gun block described comprises part of a system for a filter cigarette manufacturing factory in which multiple filter plug lengths, which may be supplied to the cigarette manufacturer by a specialist filter plug manufacturer, are distributed from a central point to a number of filter-cigarette-making machines where they are cut up into smaller lengths and combined with rods of tobacco.

The multiple plugs are fed in large batches into the hopper 3, which serves all the plug guns 1 in a single gun block 2, whence they are channelled in single width columns into the plug guns 1 by the extensions 59 of the guides 14. As the rotor 9 rotates plugs are scooped, one to each, into its flutes 13 and carried into the line with the air jet 16 which blasts them across to the discharge rotor 10. Since the two rotors 9 and 10 are synchronised, there is no relative movement between the flutes 13 and the tubes 21 so that plugs can be fed endwise into the tubes 21 from the flutes 13 without difficulty whilst the tubes are moving sideways: this is necessary for the apparatus to operate continuously. A further advantage of this arrangement is that the plugs and tubes do not have to be aligned with one another since they are in line as soon as the plugs are removed from the hopper 3. This rotor then carries them up to the position where they are in line with both the air inlet 51 and the pipe 4 and are thus blasted through the pipe 4 towards the cigarette-making machines. Since the compressed air is applied directly to the end face of the plug and since it is quite closely contained in its tube and there is very little air leakage, it is launched down the feed pipe 4 with a considerable velocity.

If a plug either fails to enter its tube 21 properly or else rebounds from the spring 27 and is not stopped at the step-down from the throat 25 to the tube 21 but rebounds out of the tube 21, the detector 36 is actuated and produces an electrical signal which is used, firstly to cause the rotation of the shaft 39 to be stopped in a position here the tube containing the jammed plug is in line with the plunger 41, and then to cause compressed air to be applied from the pipe 40 to eject the jammed plug out through the opening in the housing 8.

In the embodiment of FIGURE 7, the air jet 16 and its associated air feed means are replaced by a launching drum 46 mounted on the shaft 39 and having a plurality of spring-loaded studs 47 which are depressed by rotation under a cam 48 and released in line with the end of a plug to flick it along from one rotor to the other.

In the modification shown in FIGURES 8 and 9 the spring 27 and the bumps 28 for slowing the plugs down in the tubes 21 are replaced by a buffer plate 49 which is chamfered to cam the end of a plug to move sideways and thus translate its endwise movement into sideways movement. It is found that in this way the plugs can be slowed down much more effectively, and also they are twisted out of alignment with the throat 25 and are therefore less likely to rebound through the valve 24, if they rebound at all.

Referring now to FIGURES 10 to 13 of the drawings, the apparatus of this embodiment comprises a magazine 101 for plugs 102 to form the tips of filter tip cigarettes and a barrel 103 down which the plugs 102 are discharged by means of compressed air admitted through port 104, and the plugs 102 are transmitted from the magazine 101 to the barrel 103 by means of co-axially mounted delivery and discharge rotors 105 and 106, and friction wheels 107 and 108. Rotor 105 is mounted immediately below the outlet of the magazine 101, which carries a single stack of plugs 102, for rotation on a support shaft 109 mounted in bearings 110 and 111, which also carries the rotor 106. Rotor 105 is formed around its periphery with a plurality of axially extending flutes 112 for the plugs and rotor 106 is formed with a corresponding number of cylindrical chambers 113 in which the plugs are a close sliding fit and which are chamfered at 114 to facilitate entry of the plugs. The rotors are secured to the support shaft 109 for rotation therewith by means of a key 116 seated in a keyway 117. To assist the insertion of the key, shaft 109 is reduced and a chamber is provided at 117a. The rotors 105 and 106 are locked in position by means of a screw 118. Friction wheels 107 and 108 are each in the shape of a quater circle revolved about the axis of rotation of the wheels and are positioned immediately below the rotor 105 with their support shafts perpendicular thereto to engage plugs carried in the grooves 112 of the rotor 105. A guide plate 119 extends between the magazine 101 around the rotor 105 and between the friction wheels 107 and 108. Interposed between the rotors 105 and 106 on the upper side of the shaft 109 there is an inlet 120 for the air supply which is fitted with a valve member 121 of some self-lubricating material, such as carbon, which is positioned to communicate with the chambers 113 in rotor 106. The air is admitted from a port 104 through ducts in a supporting framework 122. The barrel 103 is positioned in line with the valve member 121 and an upper one of the chambers 113 in the rotor 106 and communicates with the chambers 113 through a further self-lubricating valve member 123, both the valve members 121 and 123 bearing against the moving end faces of the rotors 106, valve piece 123 being urged into engagement therewith by means of springs 124 acting through a collar 125. Seals 126 are provided to maintain airtightness. The barrel 103 is locked on to the framework 122 by means of a locking ring 127 having a circlip 128 which engages behind keys provided on the framework 122. A hemispherical spring 129 is provided to buffer any plugs which tend to shoot out of the lower chambers in the rotor 106. Shaft 110 is rotated through a drive shaft 130 mounted in a bearing 131 and connected with the shaft 109 by means of a dog tooth gear 132.

As is shown in FIGURE 13 the valve member 123 is formed with a passage 133 for the transmission of the plugs 102 which is of arcuate section to allow for the rotational movement of the plugs in the rotor 106 whilst they are travelling through the valve member 123. In the same way the inlet end 134 of the barrel 103 is also of arcuate seciton and the bore in the barrel 103 tapers from there down to a cylindrical bore of size not much greater than the plugs.

In operation the plugs 102 fall trhough the magazine 101 under the action of gravity and are scooped therefrom by the rotor 105, which brings them round into contact with the friction wheels 107 and 108, whereupon they are projected longitudinally into registering chambers 113 in the rotor 106, the rotation of which brings them up to their original height above the shaft 109 where the chambers 113 come into registration with the air inlet 120 and the barrel 103 so that the plugs are shot down the barrel under the action of the air pressure. If any of the plugs reach the end of the chambers 113 before they come into alignment with the barrel 103 then they bounce back off the spring 129. It will be noted that rotors 105 and 106 are spaced apart axially to accommodate the air inlet 120 above the shaft 109, the plugs being guided across the gap below the inlet 120 by an appropriate part of the guide plate 119.

It will be understood that the invention provides several advantages. In particular the plugs are loaded into the discharged chambers by continuously moving parts and each discharge chamber is neatly sealed at the moment of applying the compressed air to the articles so that they are subject to a very considerable end thrust. A further advantage lies in that the rotor assembly can be dismantled without undue difficulty.

What we claim as our invention and desire to secure by Letters Patent is:

1. Apparatus for feeding rod-like articles comprising at least one elongated discharge chamber for receiving said rod-like articles and mounted for movement between first and second positions, a pneumatic feed pipe and a compressed air supply spaced therefrom such that in said first position said chamber communicates through its opposite ends with said pneumatic feed pipe and said compressed air supply respectively for propelling an article from said chamber into said pneumatic feed pipe, guide means movable in synchronism with said discharge chamber, means for feeding said articles successively into said guide means, and means to move an article from said guide means into said discharge chamber at said second position.

2. Apparatus according to claim 1 comprising a plurality of discharge chambers and of guide means movable in continuous cyclical sequence.

3. Apparatus according to claim 2 comprising a delivery rotor and a discharge rotor, the discharge rotor having a plurality of open-ended tubes which constitute the discharge chambers and the delivery rotor being a fluted drum the flutes of which constitute said guide means.

4. Apparatus according to claim 3 wherein the rotors are mounted for rotation about a common axis and are spaced apart along the axis to accommodate said compressed air supply positioned therebetween so that the tubes in the discharge rotor register with said compressed air supply in succession as the rotor rotates.

5. Apparatus according to claim 3 wherein the means to move the articles at said second position comprises a rotatable member arranged to be engaged tangentially by the articles.

6. Apparatus according to claim 5 wherein the rotatable member comprises a friction wheel positioned to engage articles in the flutes of the fluted drum rotatable about an axis perpendicular to the lengths of the articles, and having a friction surface which is curved concavely to conform with the path swept by articles travelling on the fluted drum.

7. Apparatus according to claim 3 wherein the means to move an article into the chamber comprises a spring-loaded striker arranged to be released against the end of an article to push the article under the action of its spring loading.

8. Apparatus according to claim 7 wherein the means to move an article into the chamber comprises a drum rotatable with the delivery rotor and carrying a plurality of said strikers, one for each flute, and a cam to depress the strikers against the springs and release them in an appropriate position.

9. Apparatus according to claim 1 wherein the means to move the articles at said second position comprises a compressed air jet arranged to impinge on the ends of the articles.

10. Apparatus according to claim 1 comprising means to assist in bringing articles to rest in said chamber.

11. Apparatus according to claim 10 wherein the means to assist in bringing the articles to rest comprises a one-way valve which allows articles to pass in one direction to enter the chamber and obstructs them in the opposite direction, said valve comprising a smooth funnel-shaped lead-in surface on the entry side of said valve and a discontinuous surface on the other side.

12. Apparatus according to claim 11 wherein in the second position the lowest point of the valve passage is above the lowest point of the chamber and the valve passage is only slightly larger in cross-section than the articles.

13. Apparatus according to claim 10 wherein the means to assist in bringing the articles to rest comprises a protuberance on the inner surface of the chamber to engage the articles.

14. Apparatus according to claim 1 comprising a leaf spring positioned to close the end of the chamber remote from the end through which articles enter the chamber against egress of articles therefrom in said second position.

15. Apparatus according to claim 10 wherein the means to assist in bringing the articles to rest comprises a cam surface disposed in said second position adjacent the end of the chamber remote from the end through which articles enter the chamber to engage the ends of articles moving out of the chamber and shaped to move the ends of the articles firstly across the chamber and then back into the chamber as it moves from said second position to said first position.

16. Apparatus according to claim 1 comprising a detector to detector an article projecting through the end of the discharge chamber through which articles enter the chamber at a point situated along the path followed by the chamber while moving from the second position to said first position.

17. Apparatus according to claim 16 wherein the detector comprises a light source to generate a light beam across the end of the chamber to be interrupted by a projecting article and a photo-electric cell to detect the presence of the light beam.

18. Apparatus according to claim 16 further comprising means to eject articles from the discharge chamber after it moves from said second position and before it moves into said first position in a direction opposite to the direction in which articles enter the chamber, said means to eject articles being operated in response to a signal from said detector.

19. Apparatus according to claim 18 wherein the detector comprises a light source to generate a light beam across the end of the chamber to be interrupted by a projecting article and a photo-electric cell to detect the presence of the light beam.

20. Apparatus according to claim 18 wherein said means to eject articles comprises an air jet and means to bring the chamber to rest in line with the air jet.

21. Apparatus according to claim 1 further comprising means to eject articles from the discharge chamber after it moves from said second position and before it moves into said first position in a direction opposite to the direction in which articles enter the chamber.

22. Apparatus according to claim 21 wherein said means to eject articles comprises an air jet and means to bring the chamber to rest in line with the air jet.

23. Apparatus according to claim 1 further comprising an entry passage communicating with the chamber in said first position to receive articles emerging from the discharge chamber and entering the pneumatic feed pipe, the aperture in said entry passage adjacent said chamber extending in the direction of movement of the chamber and said entry passage tapering towards the pipe.

24. Apparatus according to claim 1 wherein said rod-like articles are cigarette filter plugs.

25. A system for feeding cigarette filter plug rods to a plurality of feed lines comprising one apparatus in accordance with claim 1 for each feed line, a mounting block for said apparatuses, a common hopper, and means to supply filter plug rods from the hopper to each apparatus, each apparatus being separately removable from said block.

26. Apparatus according to claim 1 wherein said rod-like articles are cigarettes.

27. Apparatus according to claim 1 wherein said means for feeding said articles successively into said guide means comprises a magazine in which said rod-like articles are stacked to extend horizontally and lie parallel to one another, said magazine having an outlet through which said articles can successively be discharged downwardly by gravity.

References Cited
UNITED STATES PATENTS

| | | | |
|---|---|---|---|
| 3,062,588 | 11/1962 | Molins et al. | 302—2 |
| 3,222,110 | 12/1965 | Kelly et al. | 302—2 |
| 3,365,239 | 1/1968 | Molins et al. | 302—2 |

ANDRES H. NIELSEN, Primary Examiner

U.S. Cl. X.R.

302—49